United States Patent
Hong et al.

(10) Patent No.: US 12,403,843 B2
(45) Date of Patent: Sep. 2, 2025

(54) BEAM PROJECTOR APPARATUS FOR VEHICLE

(71) Applicants: HYUNDAI MOTOR COMPANY, Seoul (KR); KIA CORPORATION, Seoul (KR)

(72) Inventors: Suk Won Hong, Bucheon-si (KR); Ga Be Nam, Hwaseong-si (KR); Gil Ju Kim, Hwaseong-si (KR); Sang Man Seo, Suwon-si (KR); Tae Hwan Kim, Seoul (KR); Hyung Sun Park, Seoul (KR); Ji Sung Bae, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 205 days.

(21) Appl. No.: 18/219,813

(22) Filed: Jul. 10, 2023

(65) Prior Publication Data
US 2024/0190358 A1  Jun. 13, 2024

(30) Foreign Application Priority Data
Dec. 7, 2022  (KR) .................. 10-2022-0170003

(51) Int. Cl.
*B60R 11/02* (2006.01)
*B60R 11/00* (2006.01)

(52) U.S. Cl.
CPC ... *B60R 11/0229* (2013.01); *B60R 2011/0014* (2013.01); *B60R 2011/0043* (2013.01); *B60R 2011/0082* (2013.01)

(58) Field of Classification Search
CPC ............... B60R 11/0229; B60R 2011/0014
USPC ........................................ 297/217.4, 217.3
See application file for complete search history.

(56) References Cited

U.S. PATENT DOCUMENTS

| | | | | |
|---|---|---|---|---|
| 11,338,678 | B2* | 5/2022 | Sasaki | B60K 35/00 |
| 2003/0184717 | A1* | 10/2003 | Kim | G03B 21/16 |
| | | | | 353/119 |
| 2017/0363938 | A1* | 12/2017 | Rossell | G03B 21/54 |

FOREIGN PATENT DOCUMENTS

| | | | | |
|---|---|---|---|---|
| DE | 102021109843 | * | 10/2022 | |
| EP | 0476254 A1 | * | 3/1992 | |
| JP | 200722174 A | * | 2/2007 | |
| JP | 2016009100 A | * | 1/2016 | |
| JP | 6806650 B2 | * | 1/2021 | B60K 35/00 |
| KR | 1020170011257 A | | 2/2017 | |
| WO | WO-2013190153 A | * | 12/2013 | B60N 2/468 |

* cited by examiner

*Primary Examiner* — Milton Nelson, Jr.
(74) *Attorney, Agent, or Firm* — MCDONNELL BOEHNEN HULBERT & BERGHOFF LLP

(57) ABSTRACT

The present disclosure relates to a beam projector apparatus for a vehicle, in which a beam projector installed on an armrest of a rear seat may be used to project a video onto a screen provided in a vehicle and enable a vehicle passenger to watch the video in a situation in which the vehicle passenger takes a rest, and as necessary, the projector may be taken out of the armrest and used in an outdoor resting space outside the vehicle to allow a user to watch a video.

18 Claims, 14 Drawing Sheets

BEAM PROJECTOR APPARATUS FOR VEHICLE

CROSS REFERENCE TO RELATED APPLICATION

The present application claims priority to Korean Patent Application No. 10-2022-0170003, filed Dec. 7, 2022, the entire contents of which is incorporated herein for all purposes by this reference.

BACKGROUND

Field

The present disclosure relates to a beam projector apparatus for a vehicle, and more particularly, to a technology associated with a beam projector apparatus for a vehicle that is installed on an armrest of a rear seat.

Description of the Related Art

Vehicle trends have moved to environmentally-friendly vehicles, and there has been an increasing use of electric vehicles as the environmentally-friendly vehicles. There is a charging time required to charge an electric vehicle, and the time for which a passenger is seated in the vehicle during the charging time has increased.

In addition, in the case of an autonomous vehicle, a driver may take a rest without directly driving the vehicle while the vehicle travels.

A passenger may want to watch videos in a vehicle interior while taking a rest or spending spare time; the convenience of watching a video in a vehicle interior may greatly assist in satisfying various needs of the passenger and contribute to a upscale image of the vehicle.

The foregoing explained as the background is intended merely to aid in the understanding of the background of the present disclosure, and is not intended to mean that the present disclosure falls within the purview of the related art that is already known to those skilled in the art.

SUMMARY

The present disclosure is proposed to provide a beam projector apparatus for a vehicle, which is installed on an armrest of a rear seat and allows a passenger to watch a video, which makes it possible to assist in improving convenience, marketability of a vehicle, and an upscale image.

An embodiment of the present disclosure provides a beam projector apparatus for a vehicle, the beam projector apparatus including a projector configured to provide a video, and a tray box configured to accommodate the projector, in which the tray box is installed on an armrest of a rear seat.

The video from the projector may be projected forward while passing through the tray box and the armrest in a state in which the armrest rotates and protrudes forward from a seatback.

The tray box may be fixedly installed on an armrest frame in the armrest.

A video projection part may be provided on a front surface of the tray box and serve as a passageway through which the video from the projector is projected.

A front cover configured to open or close the passageway of the video projection part may be installed on the video projection part to protect a lens of a projector.

The beam projector apparatus may further include a cooling fan installed in the tray box and configured to discharge heat to the outside of the tray box.

A fan guide may be installed on a rear surface of the tray box, and a cooling fan may be installed in the fan guide.

The tray box may be opened at an upper side thereof to receive or withdraw the projector, an upper cap may be coupled to the opened upper side of the tray box, and a slide door may be coupled to the upper cap and open or close the tray box.

The tray box may be opened at an upper side thereof to receive or withdraw the projector, and a rotary door may be installed on an upper portion of the tray box and open or close the tray box.

The beam projector apparatus may further include an adapter installed in the tray box such that the projector is docked on the adapter to charge the projector and transmit or receive data.

A height of the adapter may be adjustable in an upward/downward direction, and a video output angle of the projector may be changed when the height of the adapter is adjusted.

The adapter may be installed so that a height of the adapter is adjustable in an upward/downward or vertical direction by a height adjustment mechanism, and the height adjustment mechanism may include a driving dial rotatably installed on the tray box and configured to be operated by a user, a driven dial rotatably installed on the tray box and configured to rotate by receiving a rotation of the driving dial through a belt, and an operation bar installed such that one end is coupled to a position disposed eccentrically from a center of the driven dial, and the other end thereof is in contact with a lower surface of the adapter.

The other end of the operation bar may be in contact with a lower surface of a front side of the adapter, and a height of the adapter may be adjusted as the front side of the adapter moves upward or downward in a state in which a rear side of the adapter is in contact with the tray box when the operation bar is moved by a rotation of the driven dial.

The video provided from the projector installed on the armrest may be projected onto a screen provided in a vehicle interior, such that a passenger watches the video.

The projector may be configured to be taken out of the armrest and used outside a vehicle.

The projector may be installed to be positioned in a front internal space of the armrest to project the video.

According to the beam projector apparatus for a vehicle according to the present disclosure, the beam projector installed on the armrest of the rear seat is used to project the video onto the screen provided in the vehicle and enable the vehicle passenger to watch the video in a situation in which the vehicle passenger takes a rest, which makes it possible to improve convenience for the passenger, the marketability of the vehicle, and the high-grade image.

In addition, according to the beam projector apparatus for a vehicle according to the present disclosure, the projector 100 may be taken out of the armrest and then used outside the vehicle. Therefore, the user may watch a video by using the projector in an outdoor resting space such as a camping site.

DETAILED DESCRIPTION

Figure 1:
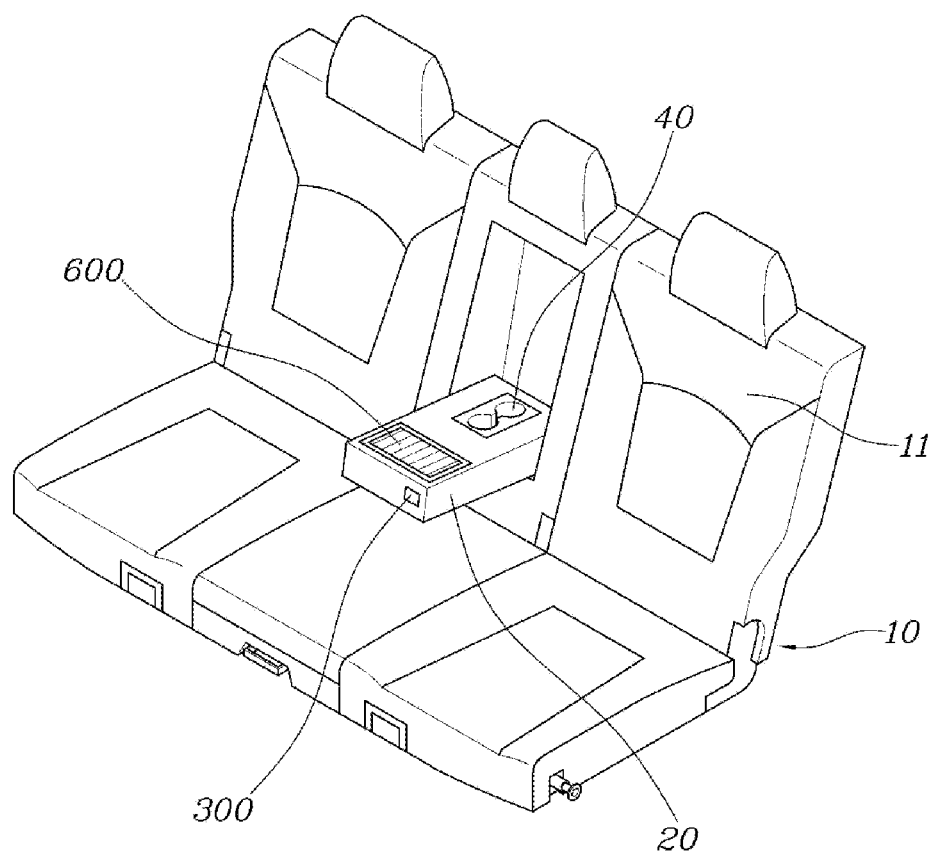
FIG. 1 is a view illustrating that a beam projector apparatus for a vehicle is installed on an armrest of a rear seat according to the present disclosure.
Figure 2:
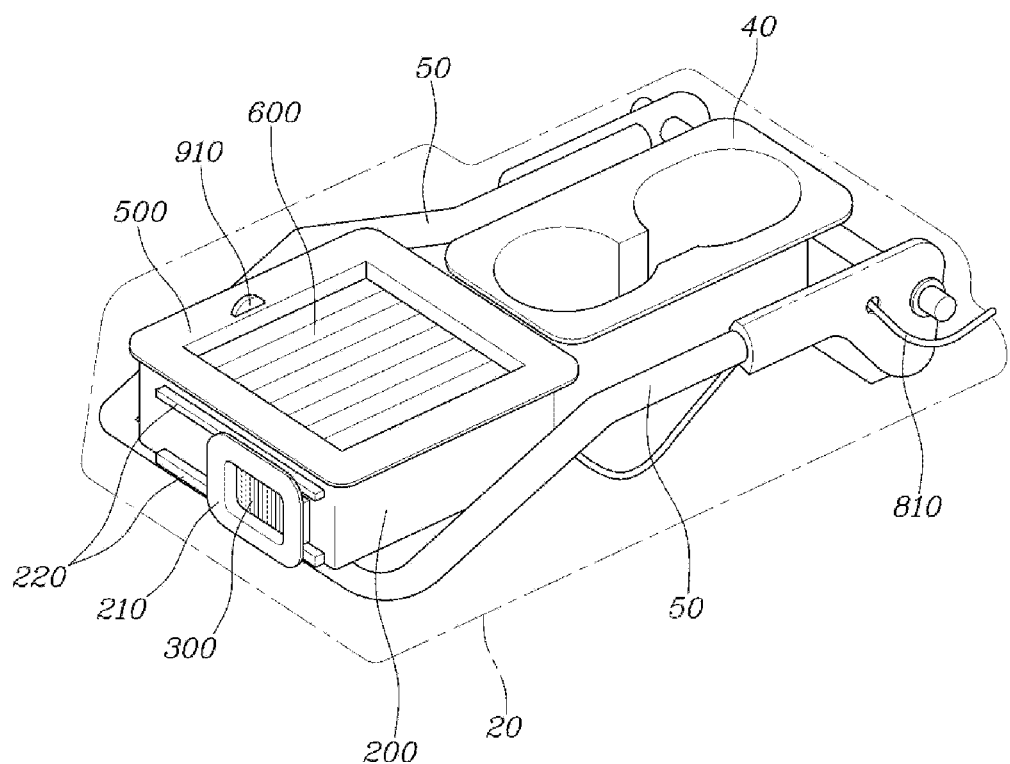
FIG. 2 is a view illustrating the armrest on which the beam projector apparatus is installed according to the present disclosure.
Figure 3:
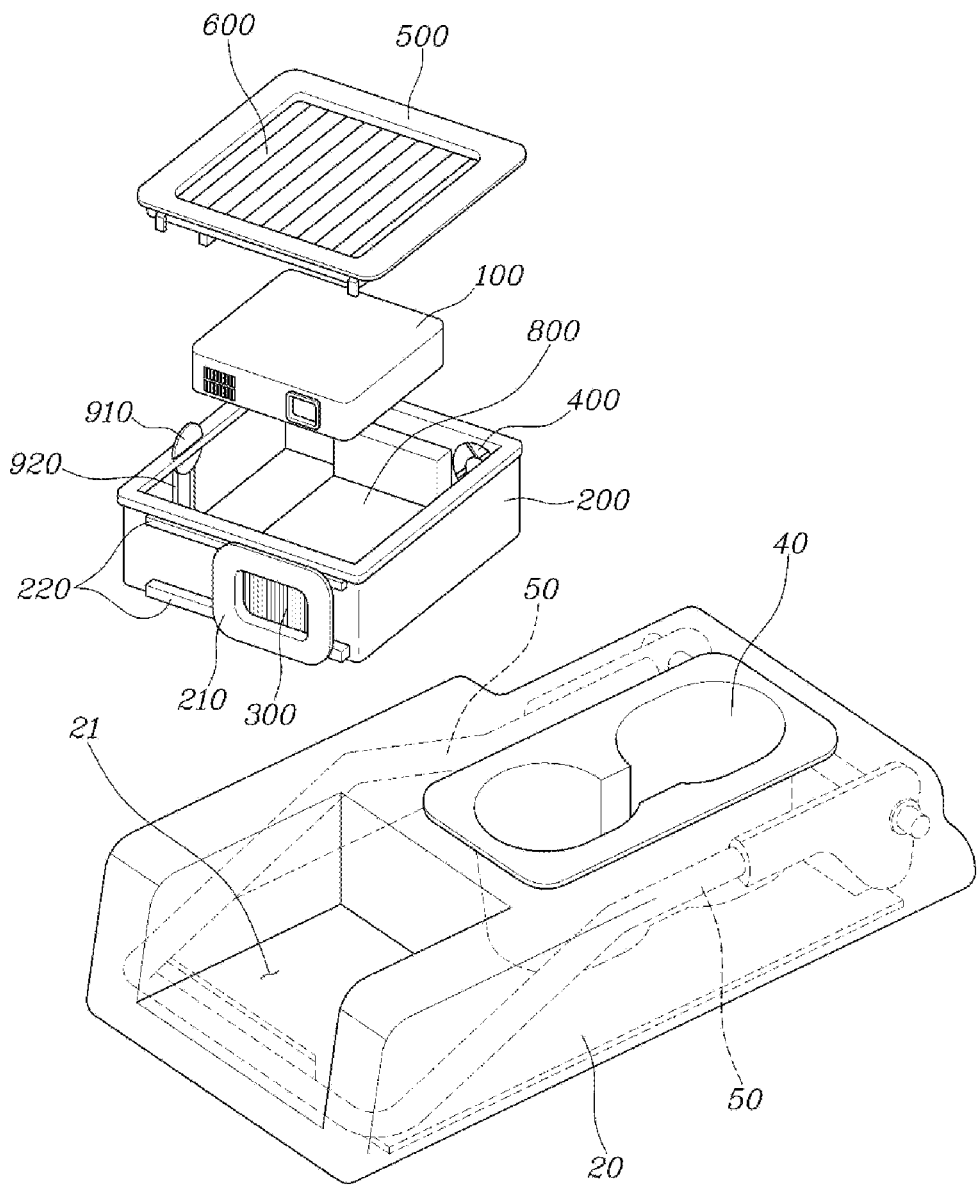
FIG. 3 is an exploded view of FIG. 2.
Figure 4:
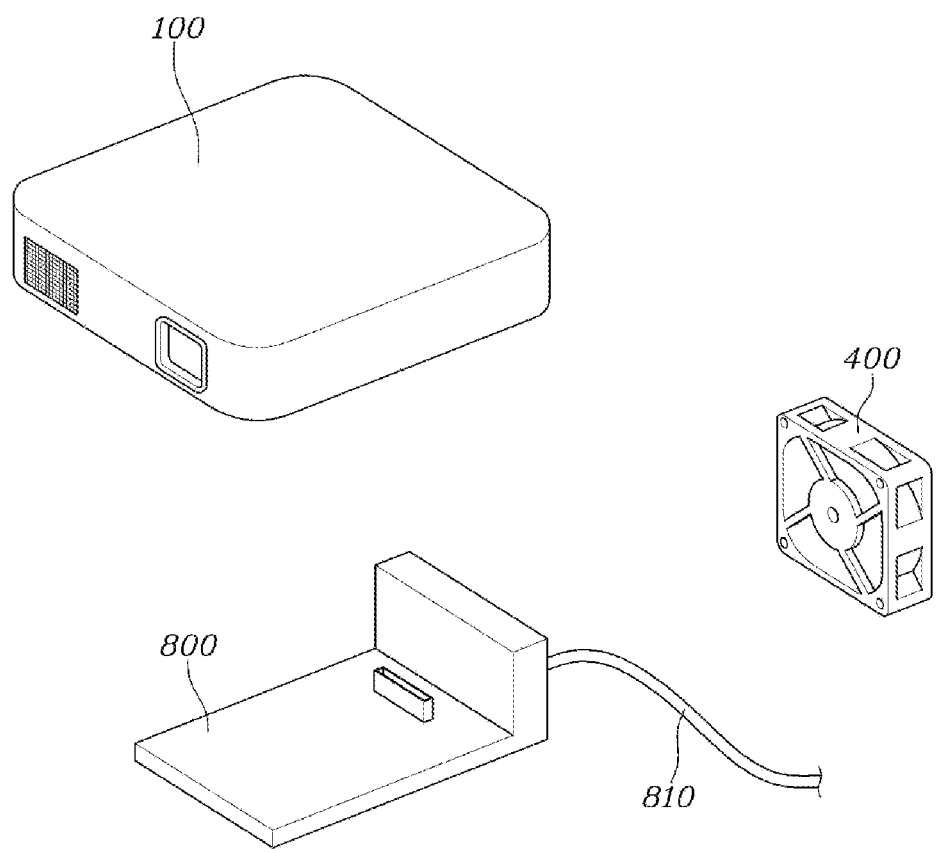
FIG. 4 is an exploded view illustrating the beam projector, an adapter, and a cooling fan according to the present disclosure.
Figure 5:
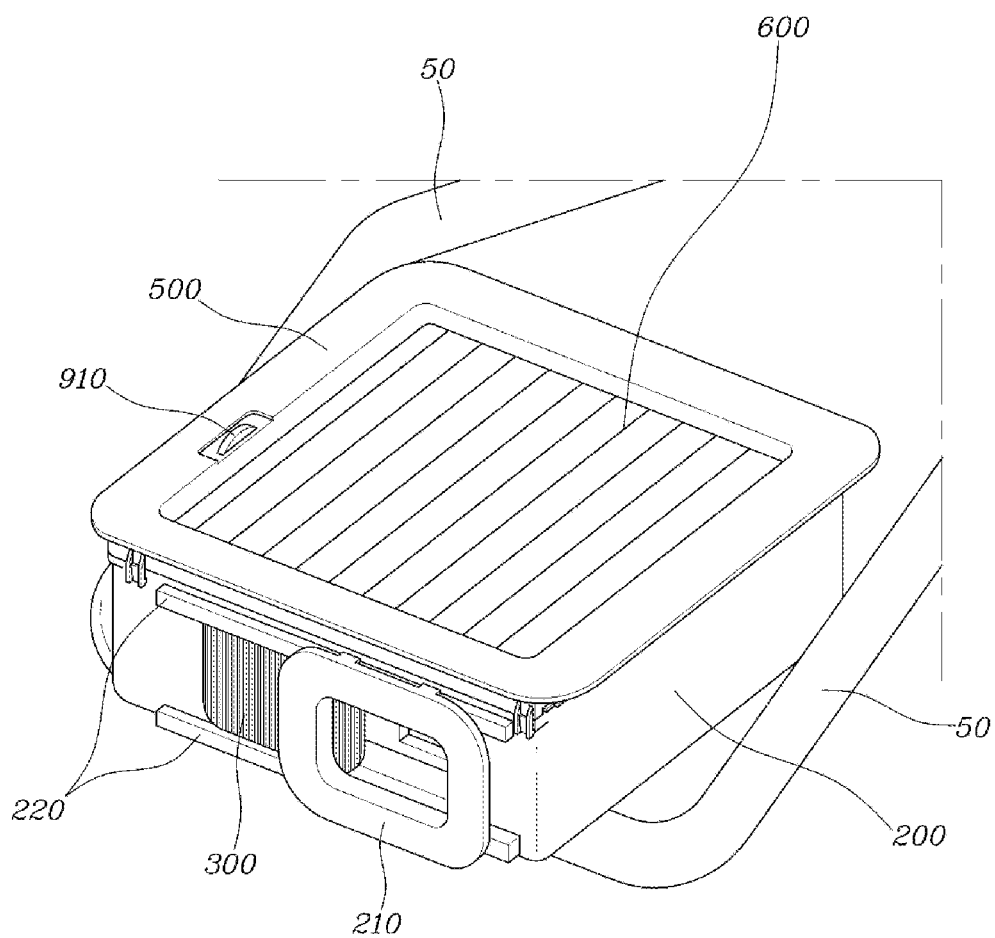
FIG. 5 is a view showing a front cover and a slide door according to the present disclosure.
Figure 6:
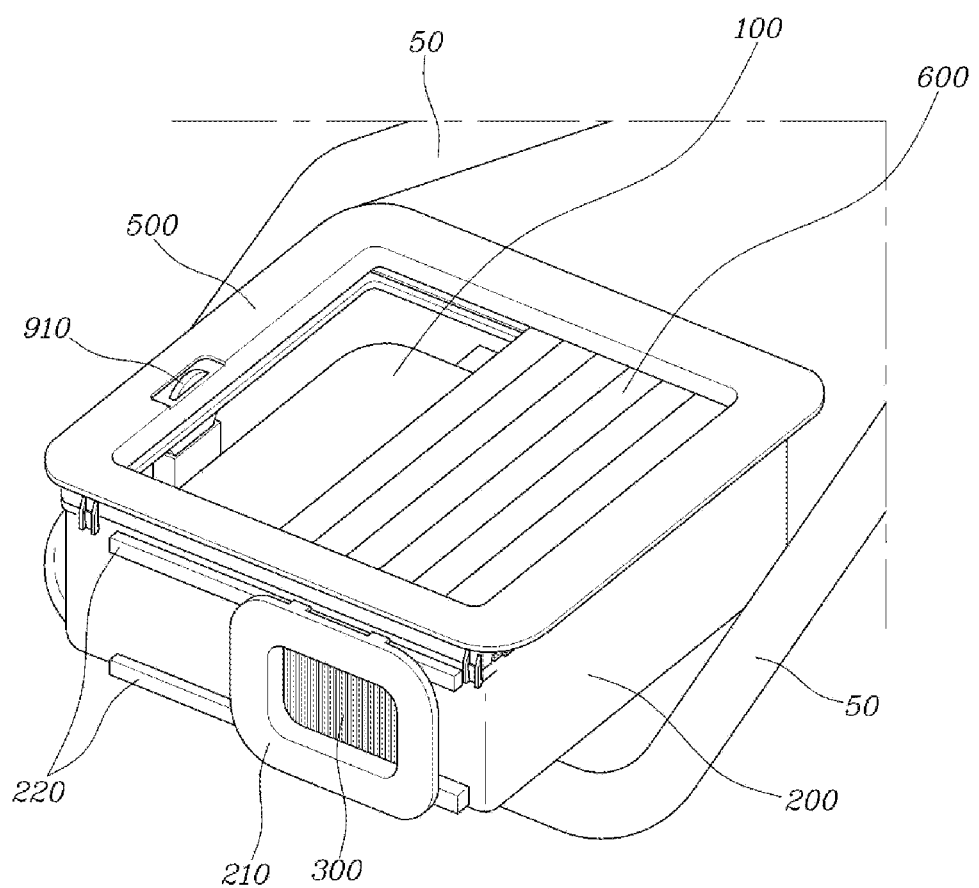
FIG. 6 is a view showing a front cover and a slide door according to the present disclosure.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification.

In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements.

When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

In addition, the term "control unit" or "unit" included in the name of "motor control unit (MCU)" or "hybrid control unit (HCU)" is merely a term widely used to name a control device (controller or control unit) for controlling a particular vehicle function but does not mean a generic function unit.

A controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Hereinafter, a beam projector apparatus for a vehicle according to an exemplary embodiment of the present disclosure will be described with reference to the accompanying drawings.

As illustrated in FIGS. 1 to 14, the beam projector apparatus for a vehicle according to the present disclosure includes a projector 100 configured to provide a video, and a tray box 200 configured to accommodate the projector 100. The tray box 200 is installed on an armrest 20 of the rear seat 10.

The projector 100 may be installed to be positioned in a front internal space of the armrest 20 in order to project a video.

The armrest 20 may be used by the passenger in the rear seat 10 (second seat) of the vehicle. The armrest 20 is rotatably installed on the seatback 11.

When the armrest 20 of the rear seat 10 is rotated forward and extended to protrude, the passenger may use the armrest 20 for a suitable purpose. When the armrest 20 stands by being rotated rearward, the armrest 20 is accommodated and stored in the seatback 11.

According to the present disclosure, the tray box 200 is installed in the armrest 20 of the rear seat 10, and the projector 100 is accommodated and installed in the tray box 200.

Figure 14:
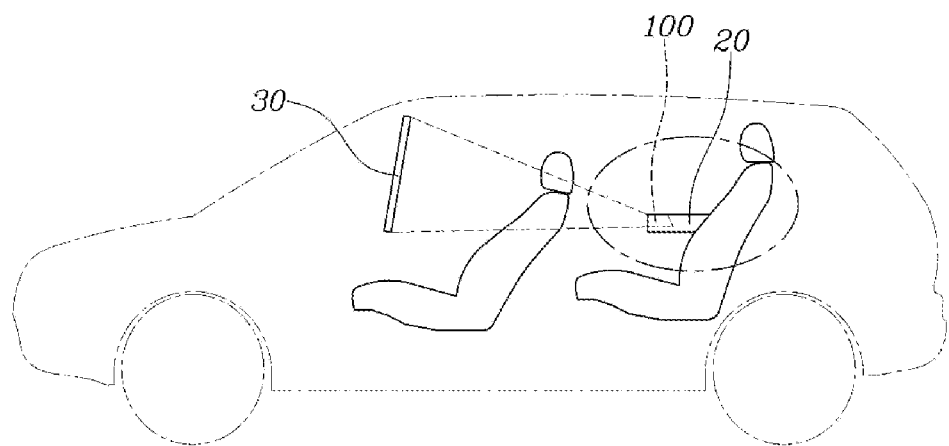
FIG. 14 is a view illustrating a state in which a video is projected onto a screen in a vehicle interior from the beam projector installed on the armrest of the rear seat according to the present disclosure.

Therefore, in the state in which the armrest 20 rotates and protrudes forward from the seatback 11, a video generated from the projector 100 is projected forward while passing through the tray box 100 and the armrest 20. As illustrated in FIG. 14, the video of the projector 100, which is projected forward, is projected onto a screen 30 provided in a vehicle interior, and a vehicle passenger may watch the video projected onto the screen 30.

As another example, the projector 100 may be taken out of the armrest 20 and then used outside the vehicle. In this situation, the projector 100 may be usefully used in an outdoor resting space such as a camping site.

Because an upper surface of the armrest 20 of the rear seat 10, on which the passenger's arm is placed, has cushioning properties like the existing armrest, the passenger may comfortably place his or her arm. In addition, a cup holder 40 may be provided in the armrest 20.

An accommodation space 21 is provided at a front side of the armrest 20, and the tray box 200 is installed in the accommodation space 21. The cup holder 40 is fixedly installed at a rear side of the accommodation space 21.

The tray box 200 may be installed to be accommodated in the accommodation space 21 of the armrest 20, and particularly, fixedly installed on an armrest frame 50.

The armrest 20 may hold or comprise the armrest frame 50. Because a rear end of the armrest frame 50 is rotatably coupled to a seatback frame, the armrest 20 may rotate forward or rearward relative to the seatback 11.

A video projection part 210 is provided on a front surface of the tray box 200 and serves as a passageway through which a video is projected from the projector 100.

The video projection part 210 is a passageway provided on the front surface of the tray box 200 and configured to connect the inside and the outside of the tray box 200. A front cover 300 for protecting a lens of the projector 100 is installed on the video projection part 210.

The front cover 300 is a slide cover configured to open or close the video projection part 210 by sliding in a leftward/rightward direction. A guide 220 is provided on the front surface of the tray box 200 and extends in the leftward/rightward direction to guide the sliding motion of the front cover 300.

In the embodiment according to the present disclosure, the beam projector apparatus may further include a cooling fan 400 installed in the tray box 200 and be configured to discharge heat to the outside of the tray box 200.

To operate the cooling fan 400, a power line (wire) is electrically connected to the cooling fan 400.

When the projector 100 is installed in the tray box 200 and operates, heat is generated from the projector 100. In the event that the heat generated from the projector 100 is not sufficiently discharged to the outside of the tray box 200, the projector 100 may break down and become damaged by high-temperature heat.

Therefore, the cooling fan 400, which serves as a cooling system, needs to be installed in the tray box 200 to discharge heat in the tray box 200 to the outside of the tray box 200.

Figure 9:
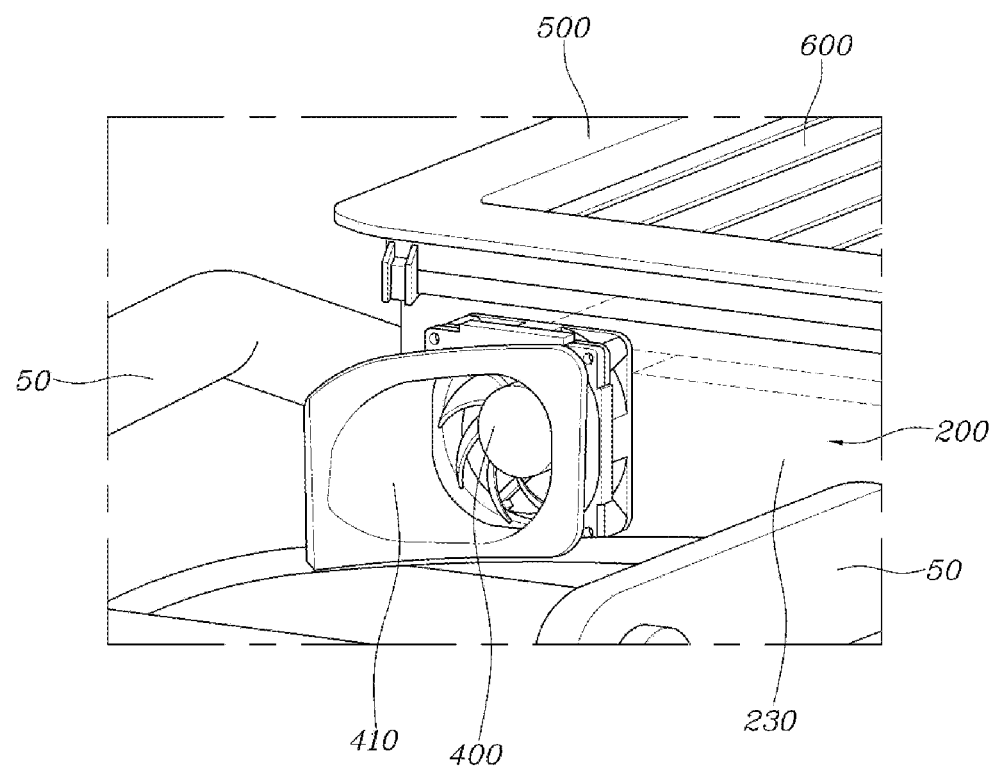
FIG. 9 is a view for explaining a fan guide and a cooling fan installed on a rear surface of a tray box according to the present disclosure.

The cooling fan 400 may be installed at a rear side of the tray box 200, which is advantageous in ensuring a space to prevent interference with peripheral components. To this end, as illustrated in FIG. 9, a fan guide 410 is installed on a rear surface 230 of the tray box 200, and the cooling fan 400 is installed in the fan guide 410.

A hole having a predetermined size is formed in the rear surface 230 of the tray box 200. The fan guide 410 rotatably coupled to the cooling fan 400 is fixedly installed to cover the hole of the rear surface 230.

The fan guide 410 serves as a passageway through which air flows when the cooling fan 400 rotates.

Figure 7:
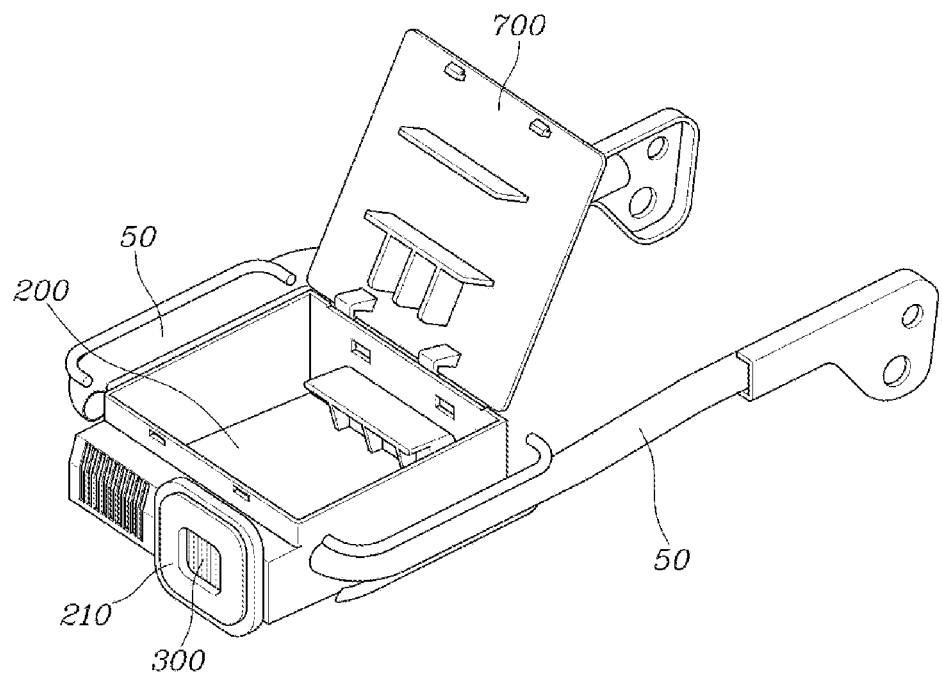
FIG. 7 is a view showing a rotary door according to the present disclosure.
Figure 8:
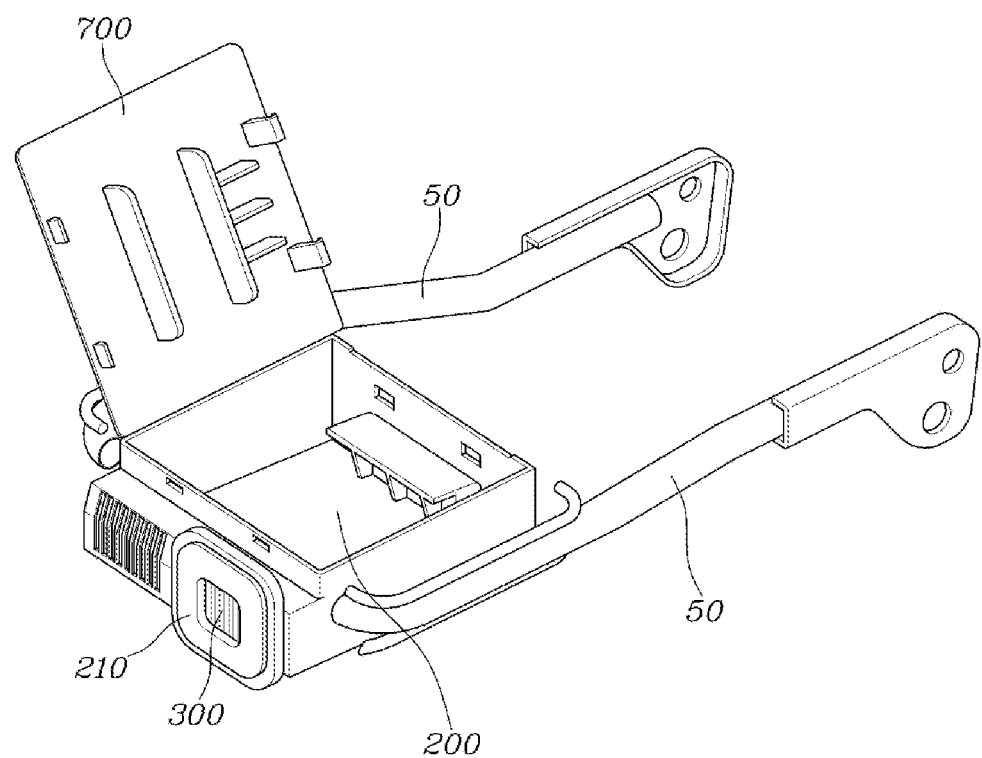
FIG. 8 is a view showing a rotary door according to the present disclosure.

The tray box 200 is opened at an upper side thereof so that the projector 100 is received or withdrawn. The upper opening portion of the tray box 200 may be opened or closed by a slide door 600, as illustrated in FIGS. 1 to 6, or opened or closed by a rotary door 700, as illustrated in FIGS. 7 to 8.

That is, an upper cap 500 may be coupled to the upper opening portion of the tray box 200, and the slide door 600 may be coupled to the upper cap 500 and open or close the upper opening portion of the tray box 200.

The slide door 600 may open or close the upper opening portion of the tray box 200 by moving in the leftward/rightward direction in the state in which the slide door 600 is guided by the upper cap 500.

As another example, the rotary door 700 may be installed directly in the upper opening portion of the tray box 200, and the rotary door 700 may rotate and open or close the upper opening portion of the tray box 200.

To rotate the rotary door 700, a door hinge may be positioned at a rear side, as illustrated in FIG. 7, or positioned at one side, as illustrated in FIG. 8.

The beam projector apparatus according to the present disclosure further includes an adapter 800 installed in the tray box 200. The projector 100 is docked on the adapter 800 to charge the projector 100 or transmit or receive data.

The adapter 800 is fixedly installed in the tray box 200. A power line 810 (e.g., wire) is electrically connected to the adapter 800 to charge the projector 100 docked on the adapter 800 and transmit or receive data.

According to the present disclosure, a height of the adapter 800 may be adjusted in an upward/downward or vertical direction. A video output angle of the projector 100 may be changed when the height of the adapter 800 is adjusted.

An output angle of the video, which is outputted from the projector 100 and projected onto the screen 30, may be adjusted in the upward/downward direction depending on a position of the screen 30. To this end, the height of the adapter 800 docked on the projector 100 may be adjusted in the upward/downward direction.

The adjustment of the height of the adapter 800 in the upward/downward or vertical direction is performed by a height adjustment mechanism 900. The height adjustment mechanism 900 includes a driving dial 910 rotatably installed on the tray box 200 and configured to be operated by a user, a driven dial 930 rotatably installed on the tray box 200 and configured to be rotated by receiving a rotation of the driving dial 910 through a belt 920 or a wire, and an operation bar 940 installed such that one end thereof is coupled to a position disposed eccentrically from a center of the driven dial 930, and the other end thereof is in contact with a lower surface of the adapter 800.

Figure 10:
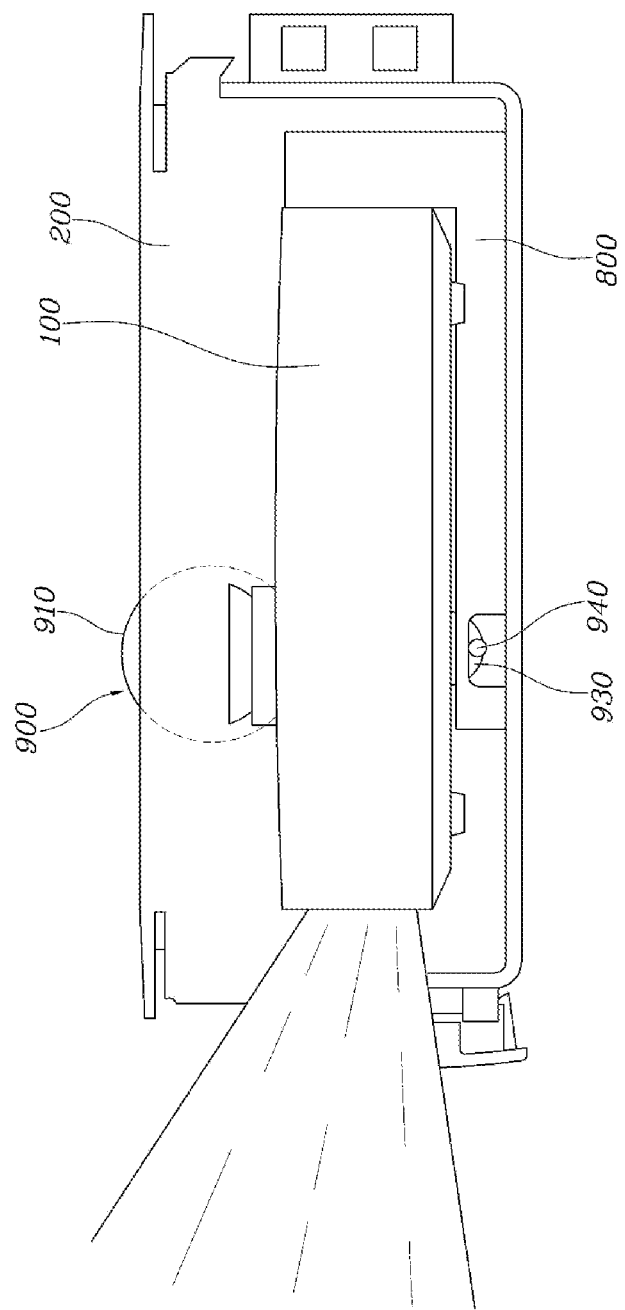
FIG. 10 is a view illustrating a state in which the horizontality of the adapter is maintained according to the present disclosure, such that the beam projector outputs a video forward at a basic angle.

FIGS. 10 to 11 illustrate a state in which the operation bar 940 is positioned at a lowermost end of the driving dial 930. Therefore, the adapter 800 is maintained in a horizontal state, and the video outputted from the projector 100 docked on the adapter 800 is outputted forward at the basic angle.

The operation bar 940 is in contact with the lower surface of the front side of the adapter 800. Therefore, the height of the adapter 800 is adjusted as the front side of the adapter 800 moves upward or downward in a state in which the rear side of the adapter 800 is in contact with the tray box 200 when the operation bar 940 is moved by the rotation of the driven dial 930.

Figure 11A:
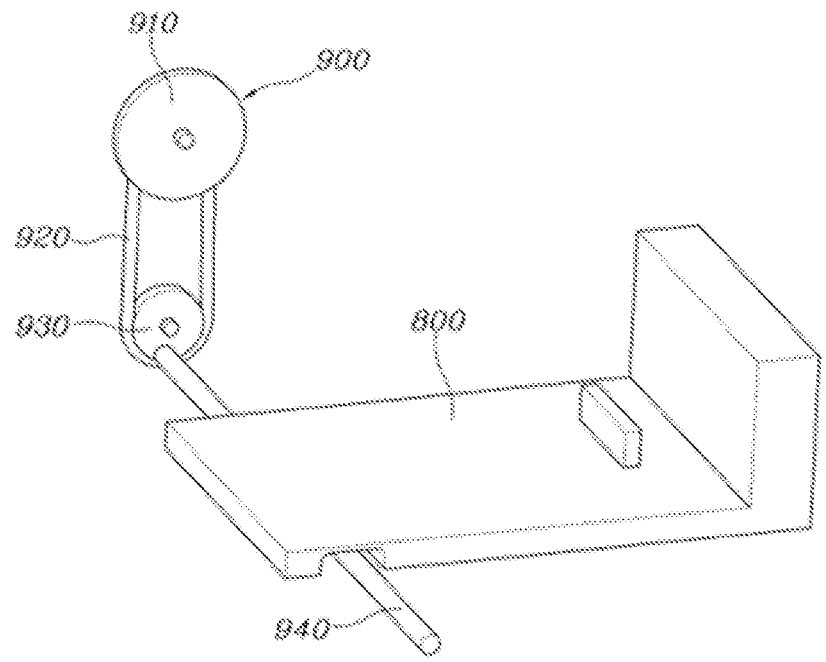
FIG. 11A is a view showing a height adjustment mechanism according to the present disclosure in a state illustrated in FIG. 10.
Figure 11B:
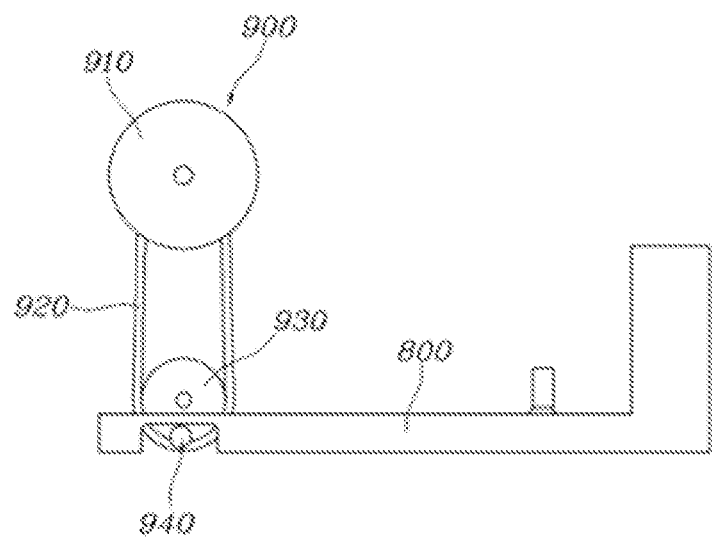
FIG. 11B is a view showing a height adjustment mechanism according to the present disclosure in a state illustrated in FIG. 10.
Figure 12:
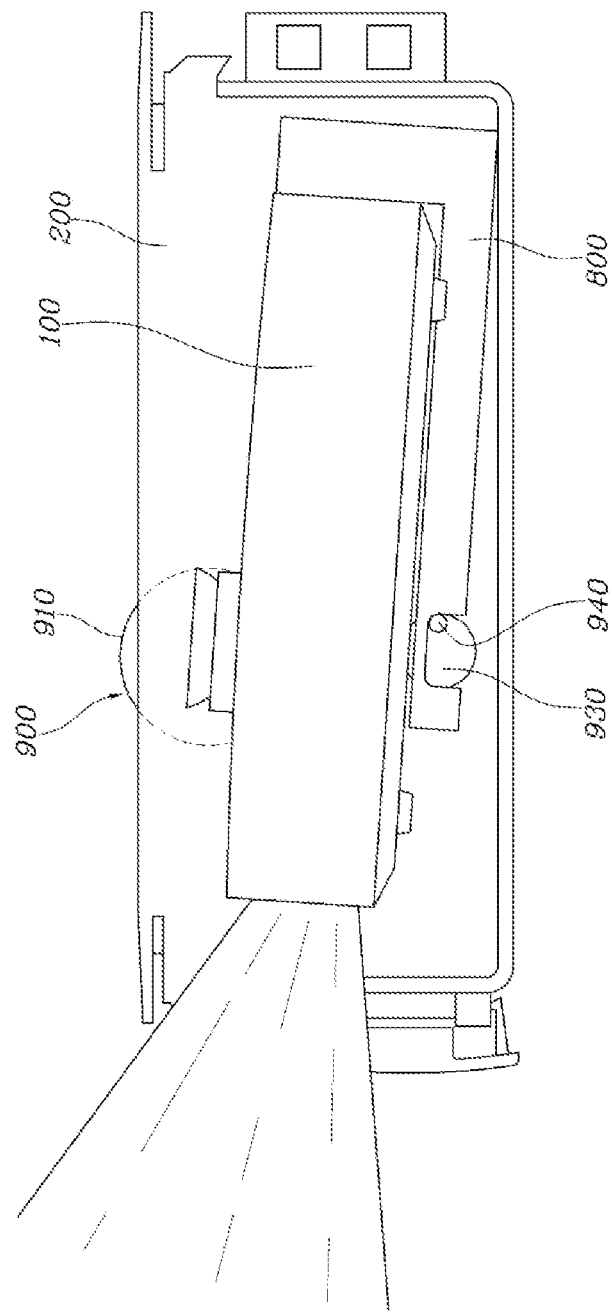
FIG. 12 is a view illustrating a state in which a height of a front side of the adapter is adjusted upward according to the present disclosure, such that the beam projector outputs a video forward and upward.
Figure 13A:
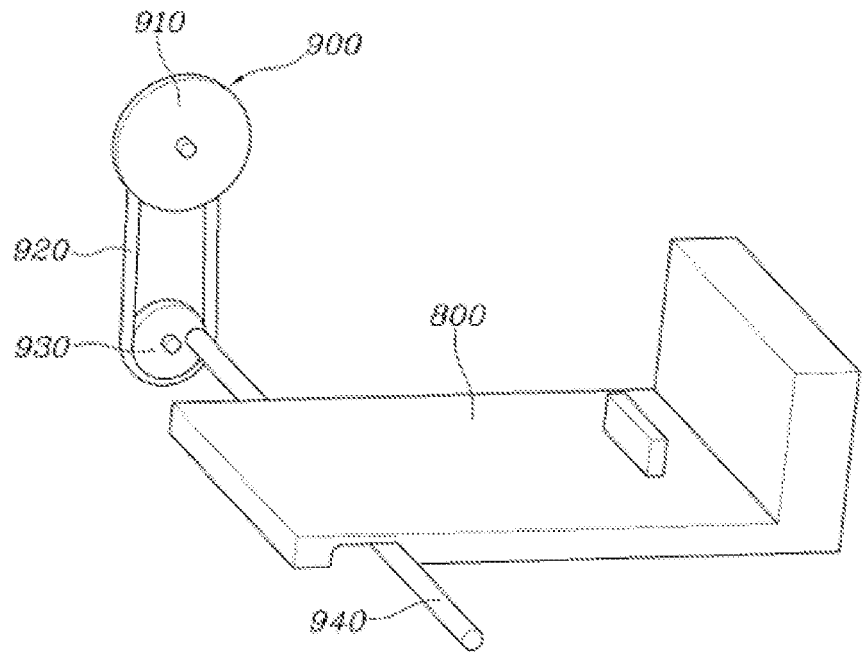
FIG. 13A is a view illustrating the height adjustment mechanism in a state illustrated in FIG. 12.
Figure 13B:
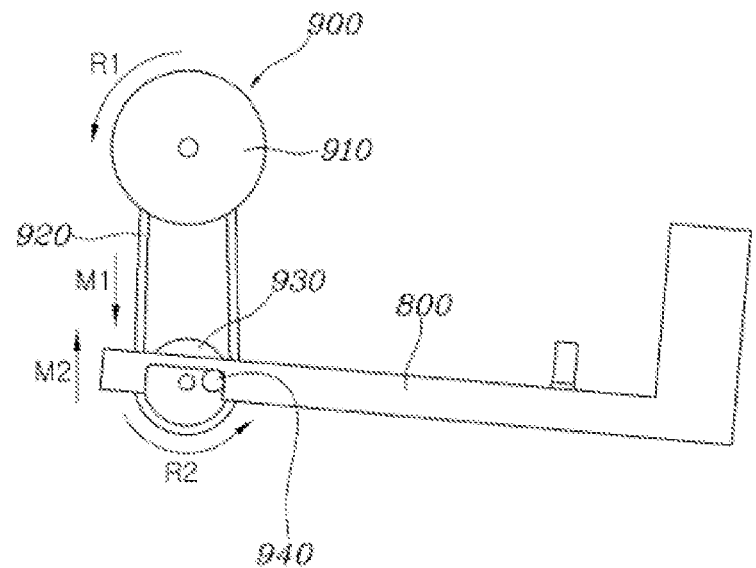
FIG. 13B is a view illustrating the height adjustment mechanism in a state illustrated in FIG. 12.

FIG. 12, FIG. 13A and FIG. 13B illustrate a state in which the operation bar 940 is moved rightward and upward from the state illustrated in FIG. 11A and FIG. 11B by the rotation (arrow R1) of the driving dial 910, the movement (arrow M1) of the belt 920, and the rotation (arrow R3) of the driven dial 930, such that the height of the adapter 800 is adjusted (arrow M2) as the front side of the adapter 800 moves upward. In this case, the video outputted from the projector 100 docked on the adapter 800 is outputted at an angle adjusted forward and upward.

As described above, according to the beam projector apparatus for a vehicle according to the present disclosure, the beam projector 100 installed on the armrest 20 of the rear seat 10 is used to project the video onto the screen 30 provided in the vehicle and enable the vehicle passenger watch the video in a situation in which the vehicle passenger takes a rest, which makes it possible to improve convenience for the passenger, the marketability of the vehicle, and the high-grade image.

In addition, according to the beam projector apparatus for a vehicle according to the present disclosure, the projector 100 may be taken out of the armrest 20 and then used outside the vehicle. Therefore, the user may watch a video by using the projector 100 in an outdoor resting space such as a camping site.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. A beam projector apparatus for a vehicle, the beam projector apparatus comprising:
    a projector configured to provide a video; and
    a tray box configured to accommodate the projector,
    wherein the tray box is installed on an armrest of a rear seat, wherein the tray box is opened at an upper side thereof to receive or withdraw the projector, an upper cap is coupled to the opened upper side of the tray box, and a slide door is coupled to the upper cap and opens or closes the tray box.

2. The beam projector apparatus of claim 1, wherein the video from the projector is projected forward from the tray box installed on the armrest in a state in which the armrest rotates and protrudes forward from a seatback.

3. The beam projector apparatus of claim 1, wherein an armrest frame is installed on the armrest and the tray box is fixedly on the armrest frame.

4. The beam projector apparatus of claim 1, wherein a video projection part is provided on a front surface of the tray box and serves as a passageway through which the video from the projector is projected.

5. The beam projector apparatus of claim 4, wherein a front cover configured to open or close the passageway of the video projection part is installed on the video projection part to protect a lens of a projector.

6. The beam projector apparatus of claim 1, further comprising:
    a cooling fan installed in the tray box and configured to discharge heat to the outside of the tray box.

7. The beam projector apparatus of claim 6, wherein a fan guide is installed on a rear surface of the tray box, and the cooling fan is installed in the fan guide.

8. The beam projector apparatus of claim 1, wherein the projector accommodated in the tray box is configured to be taken out of the tray box in the armrest and used outside a vehicle.

9. The beam projector apparatus of claim 1, wherein the projector accommodated in the tray box is installed to be positioned in a front internal space of the armrest to project the video.

10. The beam projector apparatus of claim 1, further comprising:
    an adapter installed in the tray box such that the projector is docked on the adapter to charge the projector and transmit or receive data.

11. The beam projector apparatus of claim 10, wherein a height of the adapter is adjustable in an upward and downward direction, and a video output angle of the projector is changed when the height of the adapter is adjusted.

12. The beam projector apparatus of claim 10, wherein the adapter is installed so that a height of the adapter is adjustable in an upward and downward direction by a height adjustment mechanism, and
    wherein the height adjustment mechanism comprises:
    a driving dial rotatably installed on the tray box and configured to be operated by a user;
    a driven dial rotatably installed on the tray box and configured to rotate by receiving a rotation of the driving dial through a belt; and
    an operation bar installed such that one end is coupled to a position disposed eccentrically from a center of the driven dial, and the other end thereof is in contact with a lower surface of the adapter.

13. The beam projector apparatus of claim 12, wherein the other end of the operation bar is in contact with a lower surface of a front side of the adapter, and a height of the adapter is adjusted as the front side of the adapter moves upward or downward in a state in which a rear side of the adapter is in contact with the tray box when the operation bar is moved by a rotation of the driven dial.

14. The beam projector apparatus of claim 1, wherein the video provided from the projector installed on the armrest is projected onto a screen provided in a vehicle interior, for passenger viewing.

15. A beam projector apparatus for a vehicle, the beam projector apparatus comprising:
    a projector configured to provide a video; and
    a tray box configured to accommodate the projector,
    wherein the tray box is installed on an armrest of a rear seat, wherein the tray box is opened at an upper side thereof to receive or withdraw the projector, and a rotary door is installed on an upper portion of the tray box and opens or closes the tray box.

16. A beam projector apparatus for a vehicle, the beam projector apparatus comprising:
    a projector configured to provide a video; a tray box configured to accommodate the projector,
    wherein the tray box is installed on an armrest of a rear seat; and
    an adapter installed in the tray box such that the projector is docked on the adapter to charge the projector and transmit or receive data, wherein a height of the adapter is adjustable in an upward and downward direction, and a video output angle of the projector is changed when the height of the adapter is adjusted.

17. The beam projector apparatus of claim 16, wherein the adapter is installed so that a height of the adapter is adjustable in an upward and downward direction by a height adjustment mechanism, and wherein the height adjustment mechanism comprises:
a driving dial rotatably installed on the tray box and configured to be operated by a user;
a driven dial rotatably installed on the tray box and configured to rotate by receiving a rotation of the driving dial through a belt; and
an operation bar installed such that one end is coupled to a position disposed eccentrically from a center of the driven dial, and the other end thereof is in contact with a lower surface of the adapter.

18. The beam projector apparatus of claim 17, wherein the other end of the operation bar is in contact with a lower surface of a front side of the adapter, and a height of the adapter is adjusted as the front side of the adapter moves upward or downward in a state in which a rear side of the adapter is in contact with the tray box when the operation bar is moved by a rotation of the driven dial.

\* \* \* \* \*